Sept. 30, 1947.  M. KATCHER  2,428,029
SHOCK MOTOR STOP FOR VEHICLES
Filed Jan. 26, 1944  3 Sheets-Sheet 1
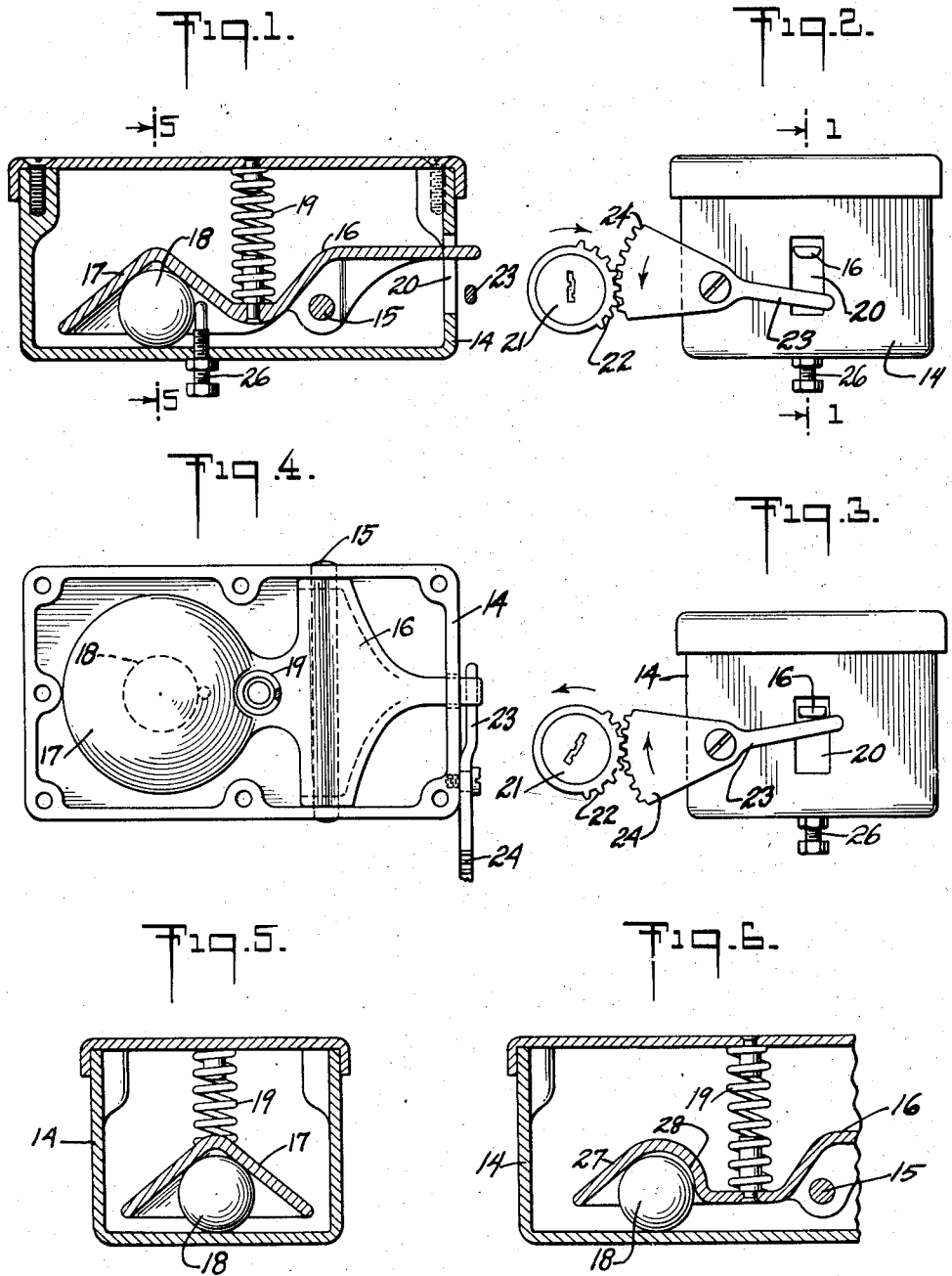
INVENTOR
MORRIS KATCHER.
BY
Emanuel Scheyer
ATTORNEY Sept. 30, 1947.　　　　M. KATCHER　　　　2,428,029
SHOCK MOTOR STOP FOR VEHICLES
Filed Jan. 26, 1944　　　　3 Sheets-Sheet 2
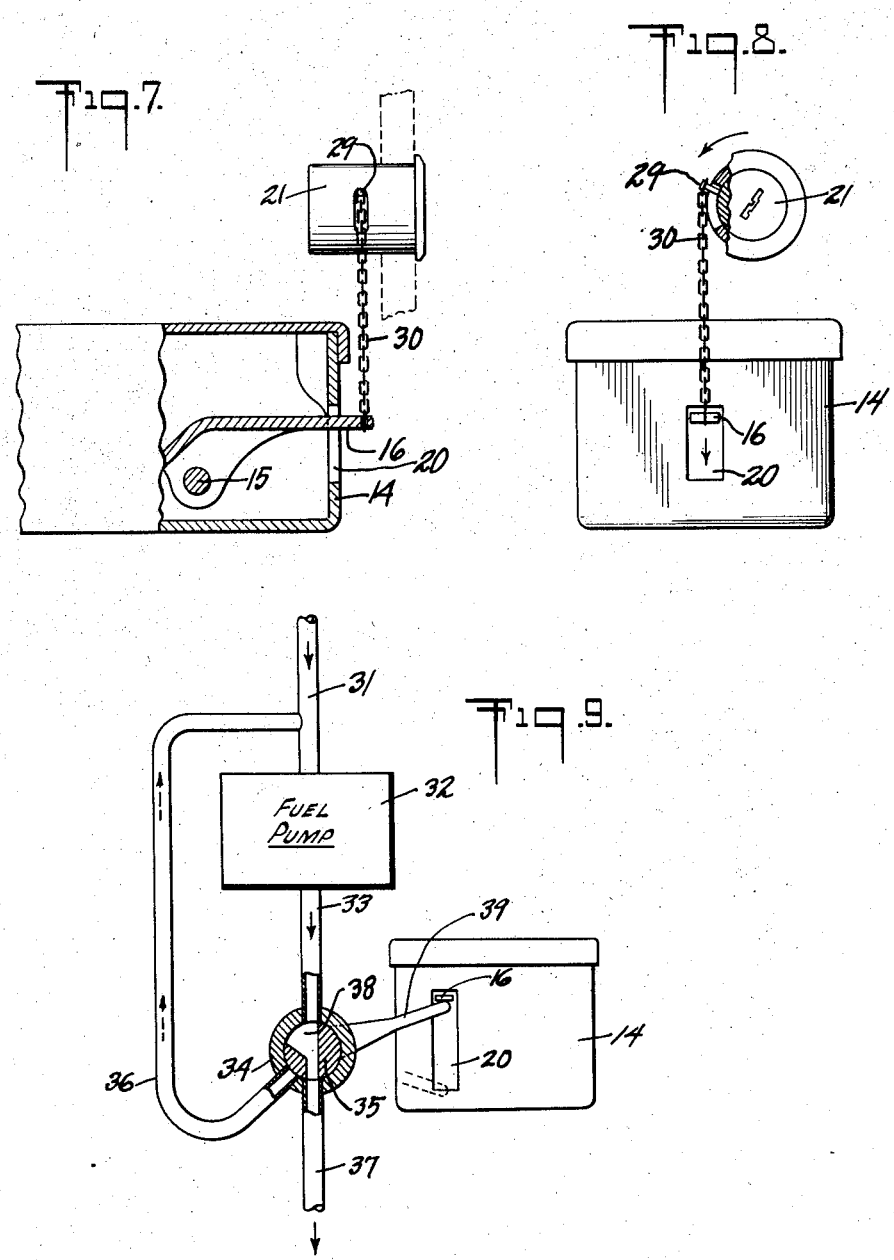
INVENTOR
MORRIS KATCHER.
BY
Emanuel Scheyer
ATTORNEY Sept. 30, 1947.   M. KATCHER   2,428,029
SHOCK MOTOR STOP FOR VEHICLES
Filed Jan. 26, 1944   3 Sheets-Sheet 3
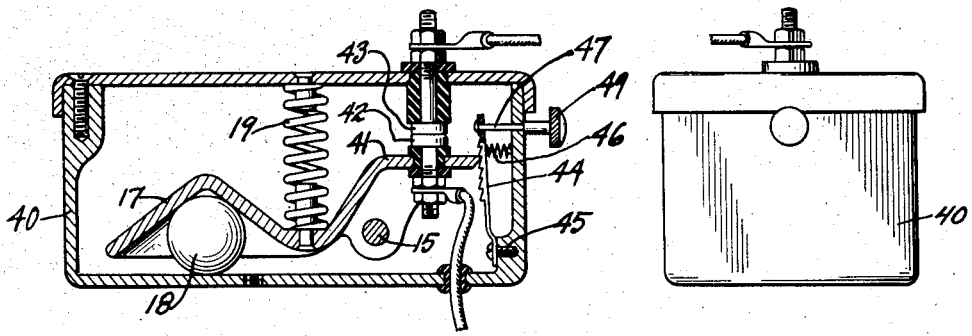
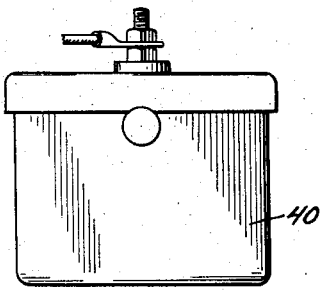
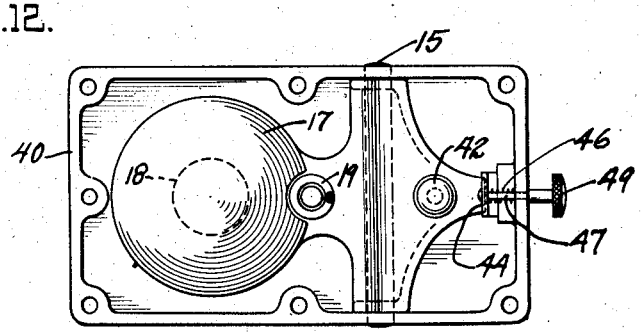
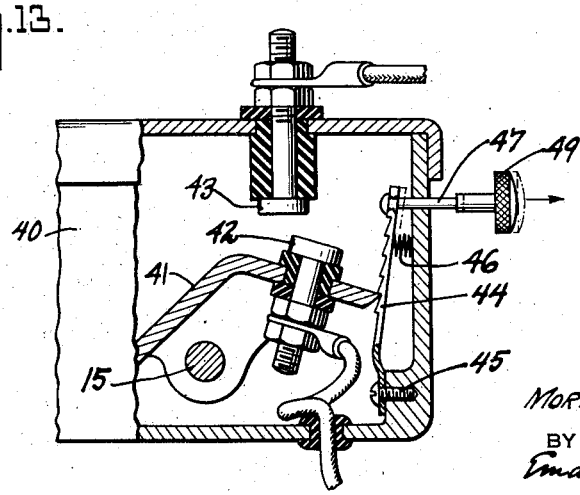
INVENTOR
MORRIS KATCHER.
BY
Emanuel Schuyer
ATTORNEY Patented Sept. 30, 1947

2,428,029

UNITED STATES PATENT OFFICE 2,428,029

SHOCK MOTOR STOP FOR VEHICLES

Morris Katcher, New York, N. Y.

Application January 26, 1944, Serial No. 519,829

6 Claims. (Cl. 180—82.1)

This invention relates to a device which will shut off the engine or motor of a vehicle when the latter is subjected to a sudden change in velocity greater in intensity than that encountered in the normal travel of a vehicle. Such a sudden change in velocity would occur when the vehicle is in a collision, say struck by another vehicle or itself striking an obstacle. One form of the device is operative when said change in velocity is in any direction. For example, the vehicle may be traveling forward and strike an object such as another vehicle or a tree. In this case, its forward velocity would suddenly be reduced or changed to zero. Another example would be for the vehicle while traveling forward to be struck from behind by a faster moving vehicle. In this case, its forward velocity would suddenly be changed by having it increased. Should the vehicle be struck a blow from the side, its lateral velocity would be suddenly changed or increased from zero to that caused by the blow. An inclined blow causing a sufficiently sudden change in velocity in an inclined direction to the normal travel of the vehicle would also stop the motor.

In another form of the device, the stopping effect of a sudden change in velocity beyond normal can be eliminated in one or more directions. For example the device can be constructed, that no stopping of the motor would be effected if the vehicle were struck from behind.

An advantage of my device is that in case of a collision and consequent loss of control of the vehicle by the driver, it will not run wild due to to the continued functioning of the engine. Further, where the motor has an ignition system, it is well known that fire sometimes occurs as a result of the collision because the ignition is on. My device can be used to cut off the ignition as the result of a collision.

My device has a part, body or mass of material which is free to move with respect to the vehicle by its own inertia when there is a sufficiently sudden change in the velocity of the vehicle to produce a force in the part, body, etc., great enough to operate a mechanism provided for stopping the motor. The mechanism has spring means and an inherent amount of friction which much be overcome by said force.

The body which is caused to be moved by its own inertia may be a ball rolling or sliding or combining such motions over a surface, or it may be non-spherical and slide over a surface or ways, or it may be a pivotally mounted mass as a pendulum and swing by its own inertia, or a mass of liquid caused to change its location by inertia by said sudden stopping of the vehicle. The device as illustrated herein has the body in the form of a ball, but it will be readily understood by those skilled in the art how to avail themselves of the other forms noted.

Other objects and advantages will become apparent upon further study of the description and drawings in which:

Fig. 1 is a longitudinal section through the inertia unit of the device.

Fig. 2 is an end elevation of the device shown in combination with mechanism for turning the key cylinder of the ignition lock of a motor having an ignition system. The cylinder is shown with the ignition off.

Fig. 3 is an end elevation taken similarly to Fig. 2 with the key cylinder shown with the ignition on.

Fig. 4 is a top plan view of the inertia unit shown with the cover removed.

Fig. 5 is a cross section taken along the line 5—5 of Fig. 1.

Fig. 6 is a partial longitudinal section taken similarly to Fig. 1 but showing a modified form of the device, a form in which a shock in a predetermined direction produces no actuation of the motor stopping mechanism.

Fig. 7 is a partial longitudinal section of the unit showing it connected to the cylinder of the ignition lock by a chain.

Fig. 8 is an end view of the unit also showing it connected to the cylinder of the ignition lock by a chain, the cylinder being set for the ignition on.

Fig. 9 is an end view of the unit shown diagrammatically in combination with a valve on the fuel line of a Diesel type engine.

Fig. 10 is a longitudinal section of a modified form of the inertia unit which is connected electrically with the ignition circuit, said unit being shown in inoperative position.

Fig. 11 is an end view of the unit of Fig. 10.

Fig. 12 is a top plan view of the unit of Fig. 10 with the cover removed, and

Fig. 13 is a partial longitudinal section to an enlarged scale, taken as in Fig. 10, but showing the unit in operative position.

In the device shown in Figs. 1–5, for a motor with an ignition system, casing 14 has a pivot pin 15 mounted in its side walls. Inertia actuated lever 16 is rotatably mounted on pin 15. One end of lever 16 is formed as an inverted conical cup 17. A ball 18, of substantial weight, rests on the floor of casing 14. Cup 17 normally rests on top of ball 18, the center of the ball normally coinciding substantially with the axis of the cone. A compression spring 19 reacts between the top of casing 14 and lever 16, normally pressing cup 17 down on ball 18, maintaining the latter in neutral position. The portion of lever 16 on the other side of the fulcrum or pivot 15 from cup 17, projects out of casing 14 through a slot 20 provided therein. Casing 14 is mounted in the vehicle (not shown) adjacent its ignition lock, preferably its key cylinder 21. A segmental gear 22 is fixed about key cylinder 21. Adjacent slot 20, is pivotally mounted on the wall of casing 14, key lever 23 with one arm formed as a segmental gear 24 and the other arm plain, the former meshing with segmental gear 22. With the ignition turned off, key lever 23 has its plain arm in the down position as shown in Fig. 2. With the ignition turned on, Fig. 3, the plain arm of lever 23 is in its up position right under the projecting portion of lever 16.

Assume, for example, that casing 14 is so mounted on the vehicle that its left end, Fig. 1, is toward the front of the vehicle. Suppose then as the vehicle traveled forward, that it suddenly hit something, as a tree. The vehicle would then be subjected to a sudden and drastic change in velocity. In the particular instance, the vehicle would be reduced or changed from the velocity at which it was traveling when it hit the tree, to zero velocity. But heavy ball 18 being free, at least momentarily to move forward substantially at the rate it was going with the vehicle before the latter was stopped, will continue to move forward of its own inertia. As it does so, it engages the inclined inner surface of cup 17, raising it against the pressure of spring 19, and thereby depressing the end of lever 16 on the other side of fulcrum 15. Said end of lever 16 is thus caused to depress the plain end of lever 23, raising segmental gear 24 as shown by the arrow in Fig. 3, causing segmental gear 22 to turn key cylinder 21 to the position shown in Fig. 2. In the latter position of key cylinder 21, the ignition is off, thus shutting down or stopping the functioning of the engine.

Considering for the present that bolt 26 is omitted, should the vehicle be struck a blow from behind, that is be subject to a rear end collision, the vehicle would be given a sudden and drastic increase in velocity forward, or to the left in Fig. 1. Because of its inertia, ball 18 will not have its velocity substantially changed, at least momentarily, while the vehicle with casing 14 and lever 16 with its cup 17 will shoot forward. This will cause ball 18 to move under the right-hand inclined inner surface of cup 17 raising the latter and thereby causing the right end of lever 16 to swing down, pushing down with it, key lever 23. Pushing down key lever 23 causes its gear segment 24 to rotate key cylinder 21 from the position shown in Fig. 3 to the position shown in Fig. 1, shutting off the ignition thereby and stopping the motor.

The same action takes place if the vehicle is hit from the side, because cup 17 is conical, so that relative motion between it and the ball in any direction will cause cup 17 to be raised and cut off the ignition.

In case it is desired to prevent a rear end collision from stopping the engine, use is made of bolt 26 which is screwed into casing 14 to the rear (right in Fig. 1) of ball 18. Under this condition ball 18 can be given motion relative to casing 14 in various directions in a plane except toward the rear of the casing, which is where its inertia would carry it in case of a rear end collision. It will be readily understood, that if desired, bolt 26 can be set in various positions around ball 18 by providing suitable holes in casing 14, to limit the device from acting when the vehicle is shocked in predetermined directions. Also more than one bolt 26 can be used to further restrict the direction of the motion of ball 18 with respect to casing 14 and cup 17.

In Fig. 6 is shown a cup 27 which has its inner conical surface formed with a depression at 28. Depression 28 functions as bolt 26 for the position shown for it in Fig. 1. When the vehicle is struck from the rear, there is no unbalanced upward force produced by the inertia of ball 18 tending to raise cup 27 and thereby turn off the ignition.

Another way of cutting off the ignition by the depression of the portion of lever 16 which projects from casing 14, is illustrated in Figs. 7 and 8. Key cylinder 21 is provided with a pin 29 to which is fastened the upper end of chain 30. The lower end of chain 30 is attached to lever 16. When the latter is depressed due to a sufficiently sudden change in velocity of the vehicle to overcome the pressure of spring 19 and the friction of the parts of the inertia unit, key cylinder 21 is turned from the position shown for it in Fig. 8 to the off position shown in Fig. 2.

Casing 14 and the parts mounted with it, for example, ball 18, spring 19 and lever 16 with its cup 17, are what I call my inertia unit. As will be shown, it can be used for stopping engines otherwise than to cut off the ignition. There are other forms of motors which operate without an ignition system, such as Diesel engines, steam engines, compressed air motors, and the recently devised turbine which is operated by the expansion of the fuel mixture set off directly within it. Even an engine with an ignition system can be stopped otherwise than by cutting off the ignition. Its fuel supply can be cut off instead.

Instead of cutting off the ignition, Fig. 9 shows my unit with its casing 14 used for cutting off the supply of fuel say to a Diesel engine. It could also be used to cut off a supply of compressed air or steam as well.

Pipe 31 leads from a fuel tank, not shown. Fuel pump 32 forces the fuel into the engine, not shown, through pipe 33, in which is located three-way valve 34. At valve 34, pipe 33 continues forward as pipe 37 leading to the engine and has a bypass 36 leading back to the fuel line 31. With valve stem 35 set as shown in Fig. 9, the fuel can pass from pipe 33 through port 38 to pipe 37 and the engine. Arm 39 is fixed to valve stem 35 at one end, its other end coming under the portion of lever 16 which projects from casing 14. A sufficiently sudden change in the velocity of the vehicle to overcome the compression of spring 19 and the friction of the other parts, Fig. 1, as when the vehicle is struck by another car, will cause the projecting end of lever 16 to move down and turn valve stem 35 clockwise. When this occurs, port 38 connects pipe 33 with pipe 36, cutting off the fuel from pipe 37 and the engine and sending the fuel back to fuel line 31.

In Figs. 10–13 is shown an inertia unit which breaks the circuit within its casing 40. Lever 41, which is rotatably mounted on pivot pin 15, carries a cup 17 which cooperates with ball 18 and spring 19 as explained for Fig. 1. Insulatively mounted on lever 41 is a terminal 42, while insulatively mounted in the top of casing 40 is a terminal 43, said terminals controlling the making and breaking of the ignition. The end of lever 41 is beveled to a sharp edge for engaging ratchet member 44 which is mounted by screw 45 on casing 40. The lower end of ratchet member 44 is in the nature of a plate spring, causing said member to have a bias outward so that the edge of lever 41 rides over its teeth. A spring 46 is provided to supplement the inherent springiness of ratchet member 44. Pin 47 is slidably mounted in casing 40, and fastened at one end to member 44 and provided at its other end outside of casing 40 with a thumb knob 49.

When the vehicle is subjected to a sudden change in velocity, as explained for Fig. 1, the end of lever 41 adjacent ratchet member 44 is moved down, separating terminal 42 from terminal 43 and thus effecting the breaking of the ignition circuit. When said end of lever 41 is moved down, it is prevented from rising again under the influence of spring 19 by the engagement of said end with the teeth of ratchet member 44, Fig. 13. When it is desired to make the ignition circuit again, ratchet member 44 has its teeth disengaged from lever 41 by manually pulling on pin 47 by means of knob 49. This permits terminals 42 and 43 to come together again under the influence of spring 19.

I claim:

1. A shock motor stop for a vehicle having a motor with an ignition system turned on and off by a lock operated by a key cylinder, said stop comprising a movably mounted body of substantial weight free to have relative motion by its own inertia with respect to the vehicle, gear teeth fastened to the cylinder for rotating the latter and mechanism fastened to the vehicle having a part engaging the body and a gear part engaging the teeth on the cylinder, said gear part being actuated to rotate the key cylinder to cut off the ignition upon a sufficiently sudden change of velocity of the vehicle to cause said relative motion of the body.

2. A shock motor stop for a vehicle comprising a ball of substantial weight, a mounting for the ball attached to the vehicle, said mounting having a substantially horizontal surface over which the ball is free to roll by its own inertia upon a sufficiently sudden change in the velocity of the vehicle, a cup-shaped member fitting inverted over the ball, the interior surface of the member being substantially conical except for a depression at one side, said member being raised by the contact of the ball with its inner surface except at the depression, as the ball is caused to roll under the surface by said change in velocity, and mechanism operated by the member when raised for stopping the motor.

3. A shock motor stop for a vehicle having a motor with an ignition system turned on and off by a lock operated by a key cylinder, said stop comprising a movably mounted body of substantial weight free to have relative motion by its own inertia with respect to the vehicle, a flexible line attached to the cylinder for rotating the latter to cut off the ignition when pulled, and a movably mounted member traveling with the vehicle in contact with the body and fastened to the line, said member being moved by the body to pull the line upon a sudden change of predetermined extent in the velocity of the vehicle.

4. A shock motor stop for a vehicle having a motor with an ignition system turned on and off by a lock operated by a key cylinder, said stop comprising a mass of material of substantial weight, a mounting for the mass attached to the vehicle, said mounting having a surface over which the mass is free to move by its own inertia upon a sufficiently sudden change in the velocity of the vehicle, a member engaging the mass adapted to be moved by the mass as the latter is caused to move by said change in velocity, and a movable part operatively engaging the key cylinder and said member, said part being forced by said member to exert a rotational force on the cylinder to effect the rotation of the latter to cut off the ignition when said member is moved by the mass.

5. A shock motor stop for a vehicle having a motor with an ignition system turned on and off by a lock operated by a key cylinder, said stop comprising a ball of substantial weight, a mounting for the ball attached to the vehicle, said mounting having a substantially horizontal surface over which the ball is free to roll by its own inertia upon a sufficiently sudden change in the velocity of the vehicle, a cup-shaped member fitting inverted over the ball, the interior surface of the member being substantially conical, said member being raised by the contact of the ball with its inner surface as the ball is caused to roll under said latter surface by said change in velocity, and a movable part operatively engaging the key cylinder and said member, said part being forced by said member to exert a rotational force on the cylinder to effect the rotation of the latter to cut off the ignition when said member is moved by the ball.

6. A shock motor stop for a vehicle having a motor with an ignition system turned on and off by a lock operated by a key cylinder, said stop comprising a ball of substantial weight, a mounting for the ball attached to the vehicle, said mounting having a surface over which the ball is free to move by its own inertia upon a sudden change in velocity of the vehicle, a lever pivotally mounted on the vehicle, one arm of the lever fitting over the ball, means for yieldingly holding said arm down on the ball, said arm being formed to be raised by the ball and the other arm of the lever lowered when the ball is caused to move under the former arm by said change in velocity, and a movable part operatively engaging the key cylinder and said other arm, said part being forced by said other arm when lowered to exert a rotational force on the cylinder to effect the rotation of the latter to cut off the ignition.

MORRIS KATCHER.

REFERENCES CITED

The following references are of record in the file of this patent:

UNITED STATES PATENTS

| Number | Name | Date |
| --- | --- | --- |
| 2,206,067 | Waltamath | July 2, 1940 |
| 2,223,097 | Ehret | Nov. 26, 1940 |
| 2,313,549 | Hornain | Mar. 9, 1943 |
| 2,202,043 | Cale | May 28, 1940 |
| 2,163,988 | Stacey | June 27, 1939 |
| 1,000,523 | Illsley | Aug. 15, 1911 |
| 1,987,495 | Soulat | Jan. 8, 1935 |
| 2,258,323 | Gray | Oct. 7, 1941 |
| 1,956,484 | Bate | Apr. 24, 1934 |
| 2,174,846 | Soulat | Oct. 3, 1939 |